United States Patent

[11] 3,592,115

| [72] | Inventor | Sadanao Ando<br>Tokyo, Japan |
|---|---|---|
| [21] | Appl. No. | 782,081 |
| [22] | Filed | Dec. 9, 1968 |
| [45] | Patented | July 13, 1971 |
| [73] | Assignee | Kabushiki Kaisha Ricoh<br>Tokyo, Japan |

[54] ELECTRONIC PHOTOGRAPHIC CAMERA
2 Claims, 9 Drawing Figs.

| [52] | U.S. Cl. | 95/13, 95/89 R |
|---|---|---|
| [51] | Int. Cl. | G03b 17/50 |
| [50] | Field of Search | 95/13, 94, 89, 89 R, 90.5 |

[56] References Cited
UNITED STATES PATENTS

| 1,424,816 | 8/1922 | Grillone | 95/13 |
| 2,578,498 | 12/1951 | Bass | 95/13 |
| 2,771,015 | 11/1956 | Hall | 95/90.5 |
| 3,057,282 | 10/1962 | Luboshez | 95/89 |
| 3,264,962 | 8/1966 | Dieffenbach | 95/13 |

*Primary Examiner*—Samuel S. Matthews
*Assistant Examiner*—Richard L. Moses
*Attorney*—Burgess, Ryan and Hicks

ABSTRACT: An electronic photographic and processing camera having an optical system for inverting an image for exposure on photosensitive paper. The exposed paper is advanced after exposure by rollers into an attached processing unit that includes processing fluid and a cutter for cutting off individual exposures. The processing unit is detachable from the camera and includes additional rollers to seal the fluid therein.

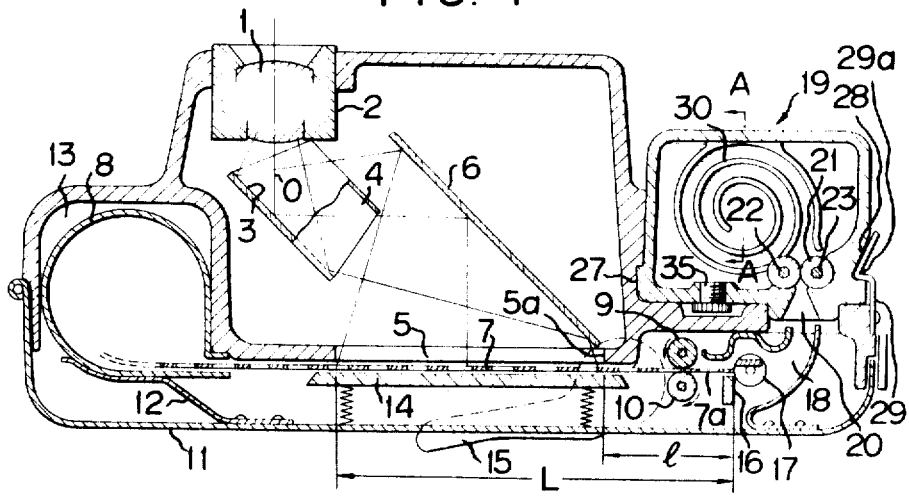
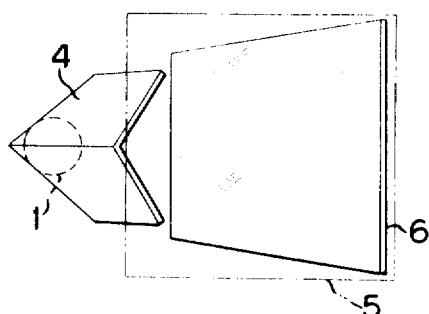
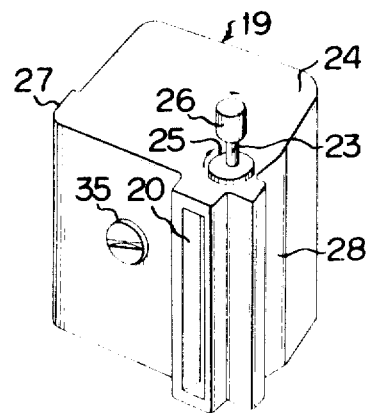
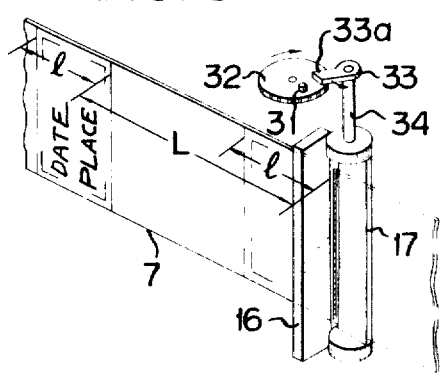
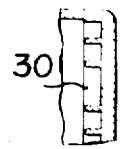

PATENTED JUL 13 1971 3,592,115

INVENTOR

Sadanao Ando

BY Burgess, Ryan & Hicks
ATTORNEYS

ELECTRONIC PHOTOGRAPHIC CAMERA

BACKGROUND OF THE INVENTION

The present invention relates to an electronic photographic camera and particularly an electronic photographic camera of the type in which a processing means can be detachably attached to the camera main body.

Normally silver halides are used as photosensitive materials. But the demand for silver all over the world is so great that the supply does not meet the demand. Therefore it has been long desired to develop a new photography in which no silver is used for the sensitive material.

At the same time, one of the major trends in the photographic camera of late is the production of "instant" cameras equipped with processing devices and there have been developed some cameras of the type described, but all of which belong to the camera in which silver halides are still used as sensitive material. Therefore, it is one of the urgent problems in the photographic industry to develop a portable camera in which a new photosensitive material other than silver halides is used.

SUMMARY OF THE INVENTION

Known in the art is an electronic photographing method in which an electrostatic latent image is formed in accordance with a variable light pattern or image to which a photosensitive paper, has been exposed. Such paper is made of a suitable noninsulating base upon which is applied a layer of photosensitive material such as zinc oxide or the like and to which is exposed to said light pattern, thereby generating the photogalvanic effect in the photosensitive layer. The electrostatic latent image is processed to produce a visible image by applying to said layer a sensitive processing agent comprising finely pulverized particles. This photographic method is called "noncharge electronic photography" and its main feature is seen in that the photography is accomplished without the use of a high-tension charging device.

The present invention relates to an electronic photographic camera based upon the above-described principle of "noncharge electronic photography" and has for its object to provide a conveniently portable electronic photographic camera, which is very practicable in use in that the exposed photosensitive paper can be instantly processed.

According to the camera of the present invention, adjacent a shutter lens incorporating a photographic lens is disposed a V-shaped reflecting mirror with its edges being inclined at 45° relative to the optical axis of the photographic lens, and laterally of this V-shaped reflecting mirror is disposed a planar mirror in parallel with said edges with the reflecting plane directing an image toward an exposure window. Both of the V-shaped reflecting mirror and the planar mirror serve to invert or rotate the direction of the image through the photographic lens so that the erect real image is focused upon the photosensitive paper.

The photographic paper to be used in the camera of the present invention is loaded in a suitable magazine of the type which is conventionally used for loading therein a conventional photographic film. The leading edge of this photographic paper is held by a pair of feed rollers when loaded in the camera for exposure. The magazine itself is held in a magazine chamber by means of a plate spring whose one end is securely fixed to the inner surface of the back cover of the camera. The photosensitive paper extending across the exposure window is held securely and accurately in the focal plane by means of a pressure plate which is pressed against guide rails disposed along the side edges of said exposure window. It is preferable to use one portion of each frame of the photosensitive paper as a recording portion for recording thereupon the date, place, data, etc. relating to the individual frame photographed.

A developing or processing device is detachably attached or mounted to the camera main body. According to one embodiment of the present invention, a pair of feed rollers disposed within the developing or processing device are pressed against each other so that the processing solution contained in the processing or developing device may not leak out through the pair of feed rollers. According to another embodiment of the present invention, there is disposed a roller group or train in which adjacent rollers are pressed against each other so as to define a space surrounded by the rollers of the roller group or train for receiving therein the processing solution. Furthermore, a pair of rollers are so disposed that they are spaced apart physically from each other when the developing or processing section or device is detached from or attached to the camera main body and they remain pressed against each other when the processing or developing section or device is mounted on the camera body, thereby permitting the advancement of the photosensitive paper.

According to the present invention, a photosensitive paper cutting-off or parting device is provided in the camera in such a manner that the cutting-off or parting operation thereof is effected in conjunction with the photosensitive paper advancing operation.

Other objects and advantages of the present invention will become apparent from the following description of preferred embodiments thereof taken in conjunction with the accompanying drawings.

BRIEF DESCRIPTION OF DRAWINGS

FIG. 1 is a plan sectional view of one embodiment of an electronic photographic camera according to the present invention;

FIG. 2 is a rear view thereof illustrating only the photographic optical system;

FIG. 3 is a perspective view illustrating a processing or developing device incorporated in the camera of the present invention;

FIG. 4 is a sectional view taken along the line A-A of FIG. 1;

FIG. 5 is a perspective view illustrating the essential parts of the photosensitive paper cutting-off device;

DESCRIPTION OF THE PREFERRED EMBODIMENTS

Figure 6:
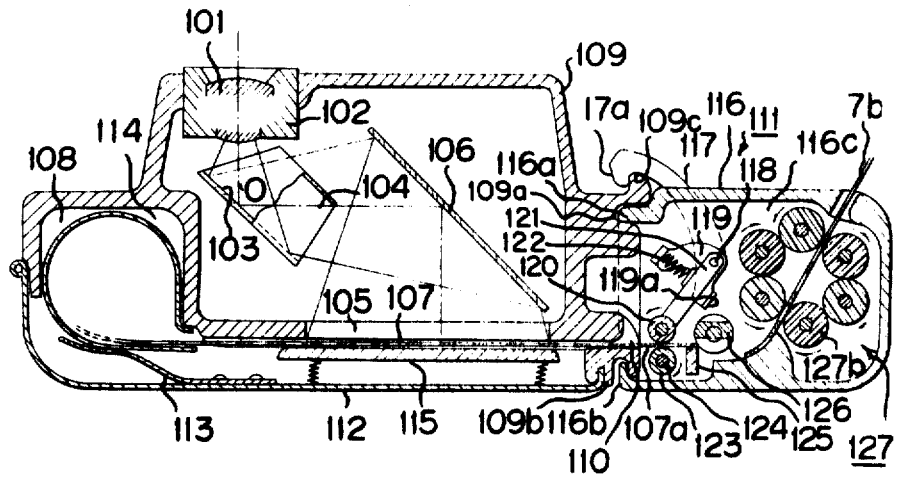
FIG. 6 is a plan sectional view of another embodiment of the present invention.
Figure 7:
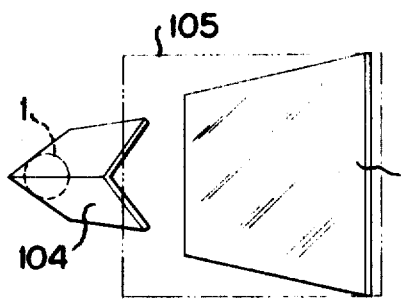
FIG. 7 is a rear view thereof illustrating only the photographic optical system.

Referring to FIGS. 1 to 5 illustrating one embodiment of the present invention, adjacent a lens shutter 2 incorporated with a photographic lens 1 is disposed a V-shaped reflecting mirror 4 with its lateral edge 3 being inclined at 45° relative to the optical axis O of the photograPhic lens 1. Furthermore, a planar mirror 6 is disposed laterally of the V-shaped reflecting mirror 4 in parallel with the lateral edge 3 thereof with the reflecting plane being directed toward an exposure window 5. The V-shaped reflecting mirror 4 serves to invert or rotate the vertical direction (when the camera is held longitudinally, the horizontal direction) of an image to be focused upon an electronic photosensitive paper 7 extended across the exposure window 5 so that when the image is viewed from the photographic lens's side, the direction of the image is the same with that of the subject.

The photosensitive paper 7 is loaded in a suitable magazine 8 as in the case of a general type used for loading photographic film and the forward edge 7a of the paper 7 is held between a pair of photosensitive paper feeding rollers 9 and 10. The magazine 8 is adapted to be held in position in a magazine chamber 13 by means of a plate spring 12 whose one end is secured to the inner surface of a back cover 11 of the camera. The extended sensitive paper is adapted to be maintained in parallel with the image focal plane by means of a pressure plate 14 which is pressed against the guide rails disposed along the side edges of the exposure window 5.

When a film-advancing lever 15 pivoted to the bottom or the top of the camera body is rotated through a predetermined angle in the direction indicated by the arrow from its normal or in operative position shown in FIG. 1, the feed rollers 9 and 10 are rotated in the direction indicated by the arrows respectively so that the photosensitive paper 7 is advanced toward the right by a length of L. Therefore, the leading edge of the photosensitive paper 7 advanced passes through a photosensitive paper cutting-off device comprising a fixed or stationary cutter 16 and a movable cutter 17 and a guide passage 18 into a photosensitive paper inlet and outlet 20 of a developing device 19.

A pair of rollers 21 and 22 rotatably disposed at the bottom of the inlet and outlet 20 are pressed against each other so that the processing solution contained in the developing device 19 may not leak out toward the inlet and outlet 20. One peripheral portion of each of said pairs of rollers 21 and 22 is watertightly pressed against the inner wall surface of the developing device 19. One end of the shaft 23 of the roller 21 extends outwardly of an end plate 23 (See FIG. 3) of the developing device 19 and carries an interlocking toothed wheel 25 and a knob 26.

A protruded portion 27 formed at the outer wall of the developing device 19 engages with the recessed portion of the camera body while a groove 28 in the outer wall of the developing device engages with a protruded portion 29a of an elastic plate 29 fixed to the camera body, whereby the developing device 19 can be held in stationary position relative to the camera body. The developing device thus held in position can be easily detached from the camera body by bending the elastic plate 29 outwardly and removing the protruded portion 29a from the groove 28.

When the developing device 19 is attached to the camera body as described above, the interlocking toothed wheel 25 engages with a driving toothed wheel 19 shown) carried by the camera body. This driving toothed 19 serves to rotate the toothed wheel 25 of the developing device 19 in the direction indicated by the arrow in cooperation with the pair of feed rollers 9 and 10 when they are rotated by the film-advancing lever 15. Therefore, the leading edge of the photosensitive paper 7 which has been advanced as far as the inlet and outlet 20 as described above is further directed into the developing device 19 by means of the roller 21 which is substantially made integral with the toothed wheel 25. A spiral guide fin 30 is interposed within the developing device 119 between both end plates of the developing device so that the side edge portions in the vicinity of the leading edge of the photosensitive paper advanced into the developing device may be advanced further into the developing device along the spiral path defined by said spiral guide fins 30.

As shown in FIG. 5, a toothed wheel 32 which is carried by the camera body and has a pin 31 is rotated in the direction indicated by the arrow in conjunction with the rotation of the feed roller 9 when the film-advancing lever 15 is rotated so as to advance the sensitive paper 7. When the photosensitive paper 7 is advanced by the distance of L, the pin 31 abuts against the lateral side edge 33a of an arm 33 so as to rotate the arm in the direction indicated by the arrow. Since the arm 33 is fixedly secured to the shaft 34 of the movable cutter 17, when the arm 33 is pushed and rotated by the pin 31, the movable cutter 17 is caused to rotate in the direction as indicated by the arrow in FIG. 1 with respect to the fixed or stationary cutter 16 so that the photosensitive paper is cut off. After the paper has been cut off, the photosensitive paper is advanced, by rotating the knob 26, into the developing device 19 until the trailing edge of the paper 7 reaches the vicinity of the inlet and outlet 20. In this case, it is preferable that the trailing edge of the photosensitive paper is stopped between the pair of rollers 21 and 22 rather than advancing the trailing edge further into the developing device, because the developed photosensitive paper can be easily withdrawn from the developing device by picking up the trailing edge held in the nip between the pair of rollers 21 and 22. For this purpose, it is preferable to attach means to the camera for indicating the length of the photosensitive paper advanced into the developing device 19.

After the cutoff photosensitive paper is advanced into the developing device, the latter is detached from the camera body as described above. The developing device is then vibrated so as to shake or agitate the processing solution satisfactorily, and thereafter the knob 26 is rotated in the direction opposite to the direction indicated by the arrow in FIG. 3 so as to discharge the photosensitive paper developed out of the developing device. Used as a processing solution is a highly sensitive processing solution in which particles which are adapted to produce or "develop" the charged latent image formed upon the sensitive paper, are mixed in a carrier liquid having a high electric resistance sufficient enough not to destroy any part of an electrostatic latent image upon the photosensitive paper and a low dielectric constant sufficient enough not to dissipate the charge of the "image-producing" particles at least when the electrostatic latent image is being developed.

When the developing power of the processing solution is decreased, a screwplug 35 of the developing device is unscrewed therefrom so that the processing solution may be replaced with new solution. Alternatively, one developing device may be replaced with a new one so that the old developing device in which a predetermined number of processings have been finished may be discarded as expendable.

Since the pair of feed rollers are interposed between one side edge 5a of the exposure window 5 and the cutting-off device, the photosensitive paper has a length of $l$ undeveloped portion in the vicinity of the trailing edge thereof in addition to the effective exposure length or frame. Therefore, as shown in FIG. 5 this unexposed portion may be advantageously used as a recording portion for recording any desired items such as the date, place, other data of the photographing and so on, and it will be advantageous to previously print in this unexposed portion "DATE" and "PLACE" of photographing, for example.

Now another embodiment of the present invention will be described in more detail with reference to FIGS. 6 to 9. Adjacent a lens shutter 102 incorporating a photographic lens 101 is disposed a V-shaped reflecting mirror 104 with its lateral side edge 103 being inclined at 45° relative to the optical axis O of the photographic lens 101. Laterally of the V-shaped reflecting mirror 104 is disposed a planar mirror 106 in parallel with the lateral edge 103 of the reflecting mirror 104 with the reflecting plane being directed toward an exposure window 105. The V-shaped reflecting mirror 4 serves to inverse or rotate the vertical direction (when the camera is held longitudinally, the horizontal direction) of an image to be focused upon an electronic photosensitive paper 107 extended across the exposure window 105 so that when the image is viewed from the photographic lens's side, the direction of the image is the same with that of its subject.

The photosensitive paper 107 is loaded in a suitable magazine 108 of a type generally used for loading other photographic films and, a leading edge 107a of the photosensitive paper extends into a developing section 111 through a photosensitive paper drawing aperture 110 in the form of a slit provided in a sidewall of a camera body 109. The magazine 108 is held stationarily in a magazine chamber 114 by means of a plate spring 113 whose one end is fixedly secured to the inner surface of a back cover 112 of the camera. The photosensitive paper 7 extending across the exposure window 105 is accurately held in the focal plane by means of a pressure plate 115 which is pressed against the guide rails disposed along the side edges of the exposure window 105.

The side surface of the developing section body 116 which is attachable to the camera body as shown in FIG. 6. A front dge portion 116a and an inwardly extending rear edge portion 116b of the developing section body are fitted respectively into the grooves 109a and 109b in the camera body so that the developing section body 116 may be attached securely to the camera body. Suitable light-tightening means are respectively provided for the paper-drawing aperture 110 and the contact portion between the developing section and camera bodies.

A clamping member 117 which is adapted to the connection a hook 17a to a protruded portion 109c of the camera body upon the attachment of the developing section body to the camera body is pivoted to a shaft 118 rotatably carried by a bottom plate 116c of the developing section body 116, and a connection or coupling member 119 is also fixedly secured to the shaft 118. An arm 121 at the free end of which is pivoted a photosensitive paper pressure roller 120 is loosely connected to the shaft 118 at the other end thereof. The pressure roller 120 is pressed against a photosensitive paper feed roller 123 carried by the developing section body, by means of the elastic force of an expansion spring 122 loaded between the arm 121 and the connection or coupling member 119.

The shaft 124 of the feed roller 123 extends out of the developing section and a feed roller operating member such as a knob is attached to the extended end of the shaft 124. When the operating member is rotated, the feed roller 123 is rotated in the direction indicated by the arrow so that the photosensitive paper 107 is advanced to the right. Laterally of the pair of feed and pressure rollers 123 and 120 is disposed a photosensitive paper cutting-off or parting device comprising a fixed or stationary cutter 125 and a movable cutter 126 in such a manner that when the movable cutter 126 is rotated through a predetermined angle in the direction indicated by the arrow, the photosensitive paper is cut off into a predetermined length. The movable cutter 126 may be arranged so as to be actuated manually from the exterior of the developing section or automatically in conjunction with the rotation of the feed roller 123 so that when the photosensitive paper is advanced by a predetermined length, then the movable cutter 126 cuts off the paper.

Figure 8:
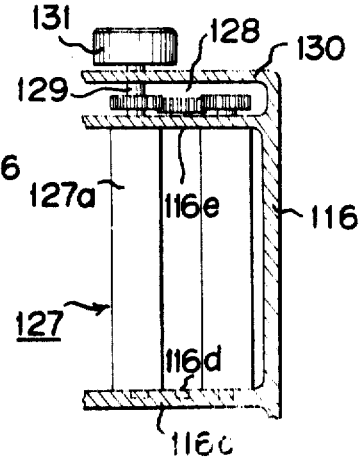
FIG. 8 is a sectional view illustrating the developing section.

A train 127 of rollers in which adjacent rollers are pressed against each other so as to form a circular space are rotatably journaled to the end plates of the developing section body 116, and each roller is interconnected with respect to one another by means of toothed wheels 128 as shown in FIG. 8 carried at one ends of the rollers respectively and in mesh with each other. The shaft 129 of one roller 127a of the train of rollers 127 loosely extends through the top plate 130 of the developing section 111 and carries an operating knob 131 for rotating each of the rollers of the train of rollers 127 in the directions indicated by the arrows.

Both ends of each roller are pressed against the inner wall surfaces 116d and 116e respectively of the developing section body 116, and a processing solution is sealed in the space defined by portions of the outer peripheries of the rollers and the above-described inner wall surfaces 116d and 116e.

Figure 9:
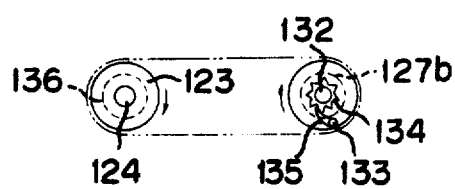
FIG. 9 is a bottom view illustrating the interlocking mechanism for the photosensitive paper feeding device.

The shaft 132 of one roller 127b of the roller trains 127 as seen in FIG. 9 extends through a bottom plate 116c of the developing section body and carries loosely a disc 133. At the end of the shaft 132 is fixedly secured a ratchet wheel 134, with which engages a pawl 135 which is attached to the disc 133. The pawl 135 is adapted to permit the rotation of the roller 127b through the ratchet wheel 123 only when the disc 133 is rotated in the direction indicated by the arrow. The pawl 135 further serves in such a manner that when the roller 127b is rotated in the direction indicated by the arrow by the disc 131, no rotary movement is transmitted to the disc 133. The disc 133 is drivingly coupled to a disc 136 securely fixed to the shaft 124 of the feed roller 123 by means of a chain or the like so that when the feed roller 123 is rotated in the direction indicated by the arrow, that is the direction to advance the photosensitive paper, the roller 127b is rotated.

After the shutter 102 (See FIG. 6) is actuated so as to expose the photosensitive paper 107, the exposed paper is advanced toward the roller train and cut off when a predetermined length of the paper is advanced by means of the fixed and movable cutters 125 and 126. Thereafter the roller 127a is rotated so that the cutoff exposed sensitive paper 7b is made to pass through the processing solution, and the processed sensitive paper is discharged out of the developing section.

When it is desired to remove the developing section 111 from the camera body, the clamping member 117 is rotated in the clockwise direction in FIG. 6 so as to disengage the hook 17a from the protruded portion 109c of the camera body. Thereafter, the developing section body is rotated about the inwardly extending side edge portion 116b in the direction in which the side edge 116a of the developing section body is pulled out of the groove of the camera body and finally the above-described inwardly extending side edge portion 116b is disengaged from the groove 109b. The attachment procedure of the developing section body to the camera body is the reverse of the steps of detachment as described above.

When the clamping member 117 is rotated in the clockwise direction, a bent portion 119a of the coupling member 119 made integrally with the clamping member 117 abuts against a side edge of the arm 121 so that the coupling member 119 and the arm 121 becomes movable in unison. Therefore, when the developing section 111 is attached to or detached from the camera body, the pressure roller 120 is positively spaced apart from the feed roller 123 so that it is not required at all to hold the leading edge of the photosensitive paper extending out of the camera body in the nip between the feed rollers and the pressure rollers in the developing section. This will prevent accidentally withdrawing that the photosensitive paper from the camera body when the developing section is detached from the camera body in which photosensitive paper is still loaded.

The present invention has been described in detail with particular reference to preferred embodiments thereof, but it will be understood that variations and modifications can be effected within the spirit and scope of the present invention as described hereinabove and as defined in the appended claims.

I claim:

1. An electronic photographic camera comprising a photographic optical system adapted to invert either the vertical or horizontal direction of an image formed through a photographic lens;

photosensitive paper cutting means adapted to cut off a photosensitive paper, which has been exposed in an exposure window disposed backwardly of said photographic optical system, from the unexposed photosensitive paper that is attached to and follows said exposed photosensitive paper;

processing means detachably mounted on the camera body and having a photosensitive paper inlet and outlet aperture which is sealed against the leadage of the processing solution from said processing means;

means adapted to advance the exposed photosensitive paper into said inlet and outlet aperture;

means adapted to detachably mount said processing means on said camera body;

a spiral shaped processing chamber located within said processing means;

a pair of abutting rollers located within and at the entrance to said processing chamber, said rollers adapted to guide said photosensitive paper into said spiral chamber and to provide sealing against leakage of the processing solution;

said processing chamber having an opening for the passage of developing solution therethrough, said opening being closable by a removable pug during operation of the developing.

2. An electronic photographic camera comprising a photographic optical system adapted to invert either the vertical or horizontal direction of an image formed through a photographic lens;

photosensitive paper cutting means adapted to cut off a photosensitive paper which has been exposed in an exposure window disposed backwardly of said photographic optical system, from the unexposed photosensitive paper that is attached to and follows said exposed photosensitive paper;

processing means detachably mounted on the camera body and having a photosensitive paper inlet and outlet aperture which is sealed against the leadage of the processing solution from said processing means;

means adapted to advance the exposed photosensitive paper into said inlet and outlet aperture;

means adapted to detachably mount said processing means on said camera body;

the construction of said processing means being such that a pair of photographic feed rollers which are pressed against each other and adapted to pull out the photosensitive paper extending from the camera body into said processing means whenever the photosensitive paper has been exposed, are drivingly coupled to a locking member for locking said processing means in position relative to said camera body; and said pair of feed rollers are adapted to be spaced apart from each other when said processing means is unlocked from said camera body.